3,307,956
PROCESS OF MAKING A SAUSAGE CASING
WITH AN ORGANOSILOXANE
Herman S. Chiu and Albert J. Veith, both of Chicago, Ill., assignors to Union Carbide Corporation, a corporation of New York
Filed Feb. 2, 1966, Ser. No. 524,448
10 Claims. (Cl. 99—176)

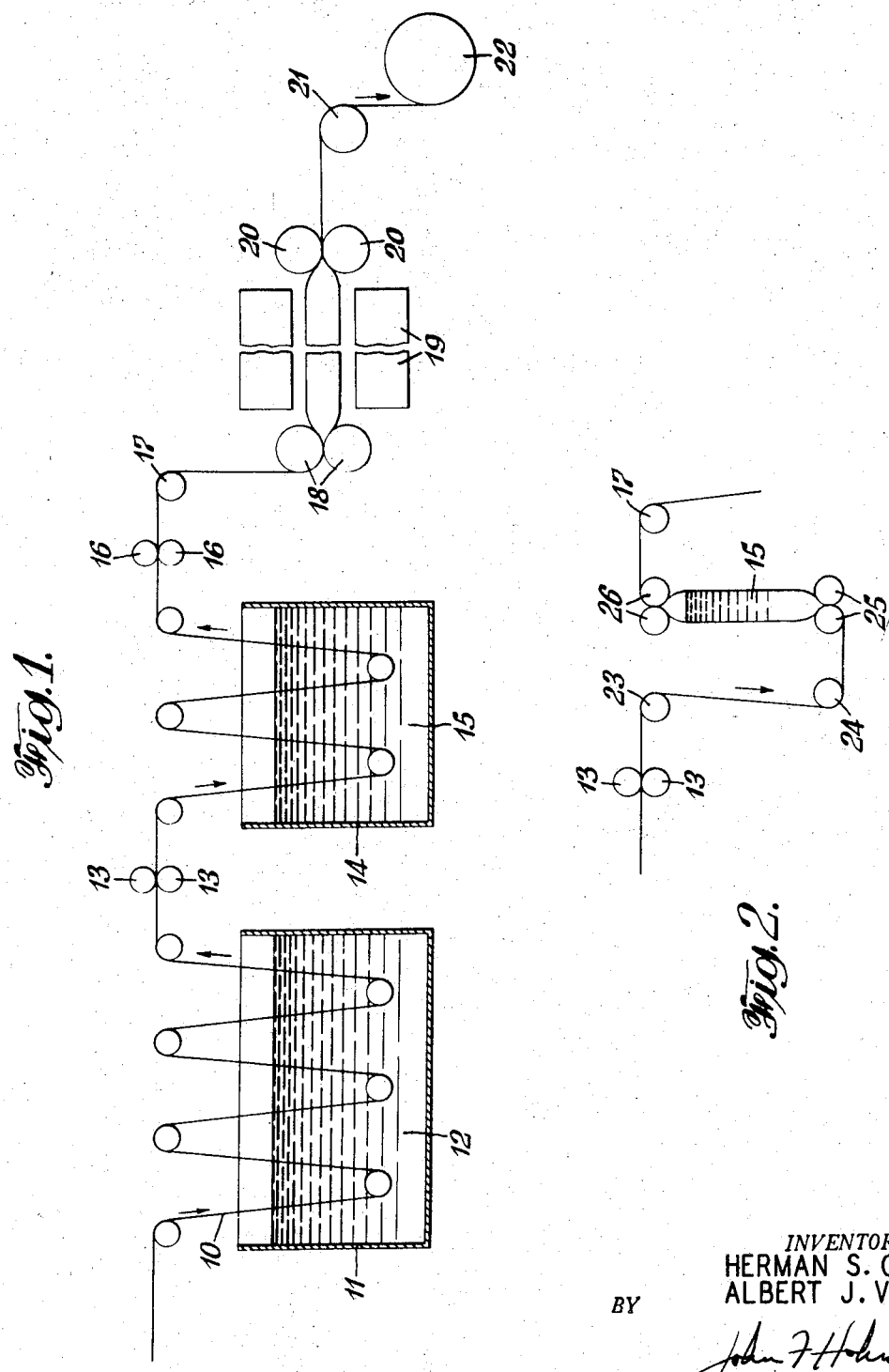

This is a continuation-in-part application of copending application Serial No. 212,551 filed July 26, 1962, now abandoned.

This invention relates to cellulosic sausage casings. More particularly, this invention relates to tubular, regenerated cellulosic food casings characterized by improved peelability from food products encased therein and to a method of preparing such casings.

Cellulosic food casings used in the sausage industry are multifunctional in that they can be used as containers during the processing of the product and as protective wrapping for the finished product. The casing is often removed from the sausage after processing and the sausage sliced and repacked into smaller units. When the casing is removed from the meat mass, there is frequently a tendency for some meat to adhere to the casing and be torn from the sausage with the casing, thereby causing surface marring of the sausage. The marring may range from minor scuffing to severe scarring depending upon the type of meat product and conditions of processing and peeling.

It is an object of this invention to provide a sausage casing which is easily removed from the meat mass.

Another object of this invention is to provide a method for producing a sausage casing which can be easily removed from the meat mass encased therein.

Other objects and advantages of the invention will become apparent hereinafter.

According to the present invention, tubular, regenerated cellulose sausage casings characterized by improved peelability from meat products encased therein with little or no damage to the surface of the meat products are prepared by coating the inner surface of such cellulose sausage casing with an organosiloxane and then drying the thusly treated casing to form a permanent bond between the organosiloxane coating and the casing.

The invention may be more readily understood by referring to the accompanying FIGURE 1 which schematically shows a preferred embodiment of the invention.

In FIGURE 1, a flattened, tubular, regenerated cellulosic film in the form of a sausage casing 10, after being formed and washed according to well-known methods, is glycerinated in its passage through tank 11 containing a glycerin-water solution 12. The rate of travel through the tank 11 and the concentration and temperature of the glycerin-water solution 12 determine the percentage of glycerin absorbed by the casing. This procedure is well known in the art. The glycerin, or equivalent polyhydric alcohol, is used to plasticize the cellulose casing.

Following the glycerination, the tubing passes between squeeze rolls 13 which minimize any solution carry over. The casing then passes through tank 14 where the external surface of the casing contacts a solution of organopolysiloxane 15. The organopolysiloxane solution diffuses through the casing wall and forms a coating which substantially covers the casing inner surface. Following this coating treatment, the tubing passes between squeeze rolls 16 to again minimize any solution carry over. It is then passed over guide roll 17, through driven squeeze rolls 18 and into a heating chamber 19, where it is dried to the proper moisture content. It has been found that the casing should be dried to a moisture content of about 30 weight percent or less, preferably about 15–20 weight percent or less to obtain a satisfactory permanent adherent bond of the organosiloxane coating to the casing. The casing is inflated by a bubble of air maintained in a relatively fixed position between squeeze rolls 18 and 20 by the sealing action of rolls 18 and 20. The heating chamber 19 can be any type of heating device which will dry the sausage casing to the proper moisture content. Circulating hot air is preferred. Exposure to atmospheric air for relatively long periods can also be used to dry the casing.

After the casing passes out of the heating chamber 19 and through squeeze rolls 20, it passes over guide roll 21 and is wound up on reel 22.

It is obvious that the treatment of cellulosic casing with an organosiloxane solution can be effected with many apparatus arrangements other than that shown in FIGURE 1 without departing from the invention, including spraying equipment, roller coaters and other apparatus suitable for applying external coatings.

Useful organosiloxanes employed in the practice of this invention are selected from the class consisting of: (1) organosiloxanes having the unit formula:

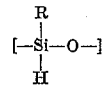

wherein R is an alkyl group, such as methyl, ethyl, propyl and the like; an aryl group, such as phenyl, naphthyl and the like; an aralkyl group, such as, benzyl, phenylethyl and the like; an alkaryl group, such as, tolyl, ethylphenyl, xylyl and the like; and organosiloxane mixtures wherein R can be different groups; (2) organosiloxanes having the unit formula:

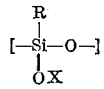

wherein R is the same as the groups defined above and X is a metal selected from the class of sodium and potassium; (3) organosiloxanes having the unit formula:

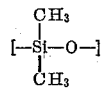

(4) organosiloxanes having the unit formula:

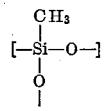

(5) partial hydrolyzates of alkyl trialkoxysilanes; and (6) mixtures of said organosiloxanes.

Examples of class (1) are: methyl hydrogen siloxane, ethyl hydrogen siloxane, propyl hydrogen siloxane, phenyl hydrogen siloxane, benzyl hydrogen siloxane, tolyl hydrogen siloxane, and the like. Examples of class (2) are: sodium methyl silanolate, potassium methyl silanolate, sodium ethyl silanolate, potassium propyl silanolate, sodium butyl silanolate, and the like. Examples of class (3) are cyclic and linear dimethyl siloxanes. An example of class (4) is methyl polysiloxane. Examples of class (5) are: partial hydrolyzate of methyl triethoxy silane and partial hydrolyzate of ethyl trimethoxy silane. Examples of class (6) are: mixture of dimethyl siloxane and methyl hydrogen siloxane and mixture of methyl polysiloxane and ethyl hydrogen polysiloxane.

In the preferred process of the present invention an aqueous alkaline solution of an organosiloxane is applied to the outer surface of a tubular, regenerated cellulosic casing. An alkaline solution is preferable and, in some instances, is necessary to render the organosiloxane water-soluble in which form it can diffuse through the casing wall and form an organosiloxane coating on the inner surface of the casing. In order to be useful for this purpose the organosiloxane should be water-soluble and also have a small enough molecule size to enable easy diffusion through the casing wall. Useful organosiloxanes for this process are the sodium and potassium salts of alkyl siloxanes, such as, sodium methyl silanolate and potassium ethyl silanolate. A preferred organosiloxane has the formula:

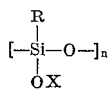

wherein R is methyl, ethyl or propyl, X is sodium (Na) or potassium (K) and ($n$) is an integer from 1 to 10 inclusive.

The aqueous alkaline sodium or potassium alkyl silanolate solutions useful in the practice of the present invention can be conveniently prepared, for example, by reacting an alkyl hydrogen siloxane, such as, methyl hydrogen polysiloxane, with an aqueous solution of sodium or potassium hydroxide. Hydrogen gas is evolved during the reaction and is removed by subjecting the solution to reduced pressure. The alkaline siloxane solution is then diluted with water and mixed with hydrochloric or sulfuric acid, if necessary, to obtain the desired concentration of organosiloxane and residual titratable alkali. An alternative preparation process is to react an alkyltrialkoxysilane with sodium or potassium hydroxide to form the metal alkyl silanolate and then dilute and neutralize to desired organosiloxane and titratable alkali concentrations. Commercially available alkaline solutions of sodium methylsilanolate, for example, can also be used. In this case, the solution can be directly diluted with water and adjusted with acid to the organosiloxanes and titratable alkali specifications desired.

This process is especially useful in the commercial sense since it is readily adaptable to continuous processing operation. It also allows a treating solution of substantially uniform composition to be used as compared to slugging techniques for treating the inner surface of cellulosic casings.

The above discussion concerning the metal salts of alkyl siloxanes relates to organosiloxane solutions which are applied externally to the tubular cellulosic casing and which diffuse through the casing to form an organosiloxane layer on the inner casing surface. While this is a preferred process for obtaining an "easy-peel" coating on the casing inner surface, other process variations can be employed if desired. The organosiloxane could be applied directly to the cellulose casing inner surface by a "slugging" technique. This technique, which is well known in the art, will be described in relation to FIGURE 2. After the tubing has passed through squeeze rolls 13 (similar to those of FIGURE 1), it passes over guide rolls 23 and 24. It then passes through a lower pair of driven squeeze rolls 25 and an upper pair of driven squeeze rolls 26. The organosiloxane treating solution 15 is contained within the casing between squeeze rolls 25 and 26. The lower squeeze rolls 25 act as a seal to maintain the composition 15 inside the casing at the desired point of travel. Alternative sealing means can also be employed if desired.

The pressure exerted on the casing by the upper squeeze rolls 26 prevents any excess carry-over of the composition 15.

The organosiloxane solution 15 is introduced into the casing by cutting the casing in two at a point between squeeze rolls 25 and 26 and inserting the desired amount of solution 15. The casing is then fed through squeeze rolls 26 and the two casing ends are tied together around a short length of a hollow rubber connecting insert in such a manner that there is an uninterrupted flow of air through the connection to inflate the casing to the desired diameter during drying.

As the casing continuously passes between squeeze rolls 25 and 26, successive portions of the inside surface of the casing contact the organosiloxane solution 15 and are coated therewith. The volume of the organosiloxane solution retained between rolls 25 and 26 will be decreased as the casing is coated. The rate of travel of the casing, the initial concentration of the organosiloxane solution 15 and the rate of exhaustion of the organosiloxane solution 15 are factors that determine the amount of organosiloxane solution with which the inside surface of the casing will be coated and the frequency with which the composition will require replenishing.

Following the coating of the inner surface of the casing and its passage through squeeze rolls 26, it is passed over guide roll 17 for further processing the same as described above for the process of FIGURE 1.

Organosiloxane materials useful in the "slugging" technique are alkaline solutions of alkali metal silanolates, such as sodium methyl silanolate. Water emulsions of alkyl hydrogen siloxanes, such as, methyl hydrogen siloxane, could also be employed. Additional useful materials are alkaline water solutions of partially hydrolyzed alkyl trialkoxy silanes, such as, methyl triethoxy silane; water emulsions of methyl silicones, such as, dimethyl siloxane and methyl trifunctional siloxane; and mixtures in solution or water emulsion forms of dimethyl siloxanes and alkyl hydrogen siloxanes. The above-mentioned water emulsions of organosiloxanes preferably employ a small amount of emulsifier, such as, nonylphenoxy polyethylene ethanol, lauric acid isopropanolamide or polyoxyethylated vegetable oil. Other useful emulsifiers are known to those skilled in the art.

Still another process within the generic scope of the invention is to incorporate the organosiloxane material directly into the viscose solution employed to form the cellulose casing. This process has the disadvantage that a relatively long curing time is necessary to provide the finished casing with a satisfactory inner surface having improved peelability characteristics. All of the organosiloxane compositions listed above for the external treatment and slugging techniques could be used in this alternate process of adding the organosiloxane to the viscose solution.

The amount of organosiloxane on the inner surface of the casing necessary to provide improved peelability can be determined empirically for any given combination of casing composition, thickness and subsequent meat processing steps. The minimum amount of organosiloxanes required will generally be present when the inner casing surface has noticeable or measurable water-repellency. Excessive amounts of organosiloxane present on the inner casing surface can be detected by the formation of fat pockets during subsequent meat processing steps.

When sodium or potassium methyl silanolate is employed as the organosiloxane in the external treatment process for casings having a thickness of about 0.001–0.006 inch, the aqueous alkaline treating solution should preferably contain about 0.2–4.0 weight percent silanolate. Lower concentrations can be employed, if desired, but the treating time will be increased in order to obtain a satisfactory inner coating. Higher concentrations can also be employed but offer no advantages since excessive concentrations can form fat pockets during subsequent meat processing.

In the case of cellulose casings treated with an alkaline solution of an organosiloxane, the amount of alkali present in the casing during drying will have a pronounced effect upon water repellency and peelability. When the molar amounts of titratable alkali are substantially in excess of the molar amounts of organosiloxane, the treated casing does not have noticeable water repellency.

The amount of titratable alkali present in the casing during drying can be controlled in several ways. First, the original concentration of the treating solution can be adjusted so that the molar amount of titratable alkali is about equal to or less than the molar amount of organosiloxane. The minimum requirement for the alkali is that needed to solubilize the organosiloxane. Second, the casing treated with an organosiloxane solution containing an excess molar amount of titratable alkali can be partially or substantially completely neutralized prior to drying of the casing to bring the alkali content of the casing down to the desirable value. Third, the casing containing excess molar amount of titratable alkali can be dried in an atmosphere containing carbon dioxide which will neutralize a portion of the alkali.

It has been found that the cellulose casing should be at least slightly alkaline upon its entrance into the drying step in order to achieve desirable peelability characteristics. If the casing is not substantially completely neutralized during drying, the resulting dried casing will be slightly alkaline. This minor amount of residual alkali does not impair the peelability characteristics, but it is undesirable in subsequent processes for printing on the casing and in use of the casing in meat processing. The residual alkali can be removed easily by washing the dried casing in water, but this has the disadvantage of requiring additional glycerination and drying steps following the water washing step.

The water washing step to remove residual caustic can be eliminated by treating the organosiloxane-coated cellulose casing with a dilute solution of a neutral organic ester prior to drying the casing. The neutral ester picked up by the casing reacts with the residual alkali in the casing during the drying process to yield a neutral, finished and dry casing.

The neutral organic esters useful in this process for removing residual alkali are preferably water soluble and non-toxic. Typical examples of useful neutral esters are ethyl lactate, glycerol monoacetate, methoxyethyl acetate, methyl glycerate, glycerol diacetate, methyl lactate, ethyl glycerate, ethyl hydracrylate, ethyl levulinate, iso-propyl glycolate, isopropyl lactate, n-propyl lactate and glycerol mono-n-butyrate.

Other neutral organic esters which can also be employed are those which are partially soluble or only slightly soluble in water and whose structures are free of hydroxyl groups; such as, glycerol triacetate. It is preferred that the neutral ester be ethyl lactate, glycerol monoacetate, glycerol diacetate or glycerol triacetate, since they are non-toxic and are miscible with water in all proportions or, as in the case of glycerol triacetate, are only partially soluble in water.

The use of dilute acids or ammonium salts of organic or inorganic acids in place of the neutral ester; such as, ethyl lactate, was found to be unsatisfactory because of interference with development of release characteristics in the casing.

Treatment of the casing with the neutral ester solution is conveniently carried out by passing the casing through a solution of the ester just prior to passing the casing into a dryer. Alternatively, the neutral ester could be added to the glycerin solutions employed to plasticize the casing. This latter technique has the disadvantage that any gross carry-over of the neutral ester will tend to reduce the effectiveness of the alkaline organosiloxane treating bath.

The present invention, both as to novel tubular, regenerated cellulose casings having improved peelability characteristics and to improved processes for producing such articles, will be further illustrated by the following examples.

EXAMPLE I

Sodium hydroxide (640 grams) was dissolved in 2000 grams distilled water. To this alkali solution heated to 50°–60° C. in a water bath were then added 640 grams of liquid methyl hydrogen siloxane. An additional 720 grams of distilled water were added to the resulting solution. This solution contained 16 weight percent organosiloxane based on weight of starting materials and 16 weight percent titratable alkali. A 100 gram portion of this solution was then mixed with 1484 grams of distilled water and 16 grams of concentrated hydrochloric acid. The resulting solution was calculated to contain 1 weight percent organosiloxane based on weight of starting methyl hydrogen siloxane and 0.58 weight percent titratable alkali based on starting weight of sodium hydroxide.

This solution was then used to treat cellulose casings to improve their peelability from processed meat contained therein.

EXAMPLE II

Two aqueous solutions of organosiloxanes were prepared in a manner similar to that described above in Example I having the following compositions:

|  | A | B |
|---|---|---|
| Sodium methyl silanolate, calculated on basis of amount of methyl hydrogen siloxane starting material (weight percent) | 0.50 | 0.29 |
| Titratable sodium hydroxide (weight percent) | 0.25 | 0.14 |

One length of glycerinated cellulose casing was treated with solution A for 3 minutes in such fashion that only the exterior of the casing was exposed to the solution. Another length of casing was treated with solution B in a similar manner. The treated casings were then dried in an oven with circulating hot air at 110° C. for 15 minutes. The treated casings along with an untreated control casing were then stuffed with a bologna meat emulsion of veal, pork, beef, dried skim milk powder, salt, spices, sodium nitrate and sodium nitrite and then processed as known in the art by heating and smoking to an internal temperature of 147° F.–150° F. (64° C.–66° C.). After smoking, the sausage was hot showered, cold showered and stored overnight at 30° F. (−1° C.). Stripping tests were run the morning after the processing.

The force required to strip the casing from the processed sausage was determined by making two cuts in the casing, ¾-inch apart, parallel to the longitudinal axis of the sausage and measuring the amount of force necessary to pull the ¾-inch wide strip from the sausage. This was done by making a third cut perpendicularly across the two parallel cuts, freeing a segment of the strip of casing and measuring the average force necessary to pull the rest of the ¾-inch strip from the sausage with a spring-loaded scale hooked to the casing with an alligator clip. A measure of this force is an indication of the tendency for the casing to adhere to the meat mass.

A peeling test of casing from meat product processed in casings treated with the above organosiloxane solutions as well as untreated casing gave the following results:

Peeling force (lbs.)
Casing treated with solution A _____ 0.02
Casing treated with solution B _____ 0.04
Untreated control casing _____ 0.19

This example indicates that coating the inside of a cellulose casing with organosiloxane material lessens the amount of force required to strip the casing from the food encased therein and therefore the tendency of the food to adhere to the casing and be removed therewith is lessened. This example also shows that external treatment with sodium methyl silanolate also provides a satisfactory inner organosiloxane coating for the casing.

EXAMPLE III

The procedure was the same as described in Example II above except that glycerin was added to the organosiloxane solutions.

Peeling force (lbs.)
Casing treated with solution A
  containing 10% glycerin _____ 0.01
Casing treated with solution B
  containing 5% glycerin _____ 0.05
Untreated control casing _____ 0.11

These results indicate that the presence of glycerin in the organosiloxane solution does not impair the release characteristics.

EXAMPLE IV

Aqueous organosiloxane solutions of the following concentrations were prepared in a manner similar to that described in Example I:

|  | C | D |
|---|---|---|
| Organosiloxane, calculated on basis of amount of methyl hydrogen polysiloxane starting material (weight percent) | 4.0 | 0.7 |
| Titratable sodium hydroxide (weight percent) | 2.0 | 0.35 |

A length of casing was passed through solution C for 19 seconds and then passed through an aqueous solution containing 10 weight percent ethyl lactate and 10 weight percent glycerin for 19 seconds before being dried in an oven dryer with hot air. Another length of casing was similarly passed through solution D and the ethyl lactate-glycerin solution and dried.

A neutral casing was obtained. Peeling test values were as follows:

Peeling force (lbs.)
Casing treated with solution C and
  10% ethyl lactate solution _____ 0.0
Casing treated with solution D and
  10% ethyl lactate solution _____ 0.05
Untreated control casing _____ 0.11

This example indicates that removal of residual alkali does not impair release characteristics.

EXAMPLE V

An aqueous organosiloxane solution was prepared according to the procedure of Example I containing 1 weight percent organosiloxane (calculated on basis of amount of methyl hydrogen polysiloxane starting material) and 0.58 weight percent titratable sodium hydroxide. Glycerinated casing was treated with this solution by dipping for 26 seconds and dried in an oven dryer. The dry casing had residual alkalinity. Peeling test results were as follows:

Peeling force (lbs.)
Treated casing _____ 0.06
Untreated control casing _____ 0.24

This example further indicates that the organosiloxane coating even with residue alkali still improves the peelability of a cellulose casing.

EXAMPLE VI

An aqueous organosiloxane solution was prepared in a manner similar to that described in Example I containing 0.5 weight percent organosiloxane (calculated on basis of amount of methyl hydrogen polysiloxane starting material) and 0.46 weight percent titratable sodium hydroxide. Glycerinated casing was conducted through this solution for 30 seconds followed by a drying step which consisted of hanging the casing overnight under ambient room conditions of 25° C. temperature and 60% relative humidity. The inner surface of the dried casing was water repellent which is a good indication that it also has improved peelability characteristics.

The above examples all employed alkaline solutions of organosiloxanes as the treating agent. The following example describes use of an organosiloxane-water emulsion as the treating material.

EXAMPLE VII

An organosiloxane emulsion (A) was prepared by placing 40 grams of methyl hydrogen polysiloxane, 4 grams of polyoxyethylated vegetable oil emulsifier and 56 grams of distilled water in a 4 ounce jar. The contents were mixed by shaking. This mixture was then pumped twice through a hand operated homogenizer. The resultant emulsion was stable for several days at room temperature. A catalyst (B) was prepared by mixing and processing 37.5 grams of zinc octasol solution (solvent solution of the zinc salt of 2-ethylhexoic acid containing 8 weight percent zinc as metal), 3.75 grams polyoxyethylated vegetable oil emulsifier and 58.75 grams distilled water as described above. This emulsion creamed or separated into two layers within two hours, but was easily reconstituted into a homogeneous mixture by simple shaking.

A 15 gram portion of organosiloxane emulsion (A) was mixed with 4 grams of the catalyst emulsion (B) and diluted with 281 grams of distilled water. The mixture was shaken to insure homogeneity of the components. The inner wall of a regenerated cellulose casing was coated with this mixture for 30 seconds. The coated sample was then passed through a padder roll to remove the excess liquid. The sample was heated for 30 minutes in an air circulating oven at 100° C. After cooling to room temperature the water repellency of the casing inner surface was observed by comparing the contact angle of water on its surface. Using an untreated sample of cellulose casing as a control, it was observed that a high contact angle resulted when a drop of water was placed on the treated material, and no wetting occurred for several minutes; whereas the untreated control showed a poor contact angle with water and wetting occurred within seconds.

EXAMPLE VIII

Several runs were made with different amounts of titratable alkali and different processing conditions. The processing conditions and results are tabulated below. The treated casings were evaluated by observation of water repellency on the inner surface. The water repellency was graded as 5 (very good) to 0 (no observable repellency). Alkaline solutions of sodium methyl silanolate were used throughout. The treating solutions for runs 1–14 were prepared as follows. Sodium hydroxide (800 grams) was dissolved in 3400 grams of water. This alkali solution was then mixed with 800 grams of methyl hydrogen polysiloxane. This product was identified as "Solution I." Portions of "Solution I" were diluted with water and mixed with concentrated hydrochloric acid to obtain solution products containing 1 weight percent organosiloxane (based on original weight of methyl hydrogen siloxane starting material) and various levels of residual titratable alkali. Samples of tubular regenerated cellulose casings were treated with these solutions by dipping for 30 seconds, dried and tested for water repellency. The treating solutions for runs 15–17 were prepared by mixing 75 grams of an organosiloxane solution containing 20 weight percent sodium methyl silanolate and 12 weight percent sodium hydroxide with 1425 grams of water. This solution, which contains 1 weight percent sodium methyl silanolate, was mixed with various amounts of concentrated hydrochloric acid to form products having various amounts of titratable alkali. Samples of regenerated cellulose casings were treated with these latter solutions by dipping for 30 seconds, dried and tested for water repellency.

| Run | Gram-Moles methyl hydrogen siloxane or sodium methyl silanolate | Gram-Moles sodium hydroxide | Drying Conditions | Water Repellency |
|---|---|---|---|---|
| 1 | 0.267 | 0.400 | Oven | 1 |
| 2 | 0.267 | 0.298 | do | 4 |
| 3 | 0.267 | 0.267 | do | 5 |
| 4 | 0.267 | 0.237 | do | 5+ |
| 5 | 0.267 | 0.195 | do | 5+ |
| 6 | 0.267 | [1] 0.159 | do | 5 |
| 7 | 0.267 | [2] 0.135 | do | 5 |
| 8 | 0.267 | [3] pH <7 | do | 0 |
| 9 | 0.267 | 0.400 | do | [4] 1 |
| 10 | 0.267 | 0.400 | Air | 5 |
| 11 | 0.267 | 0.228 | Air | 5+ |
| 12 | 0.267 | 0.400 | Oven [5] | 4 |
| 13 | 0.267 | 0.400 | do [6] | 4+ |
| 14 | 0.267 | 0.400 | do [7] | 5 |
| 15 | 0.153 | 0.146 | Oven | 3½ |
| 16 | 0.153 | 0.092 | do | 5 |
| 17 | 0.153 | [8] 0.033 | do | 5 |

[1] Slight precipitate of organosiloxane formed.
[2] Precipitate of organosiloxane formed.
[3] Heavy precipitate of organosiloxane formed.
[4] The dry sample was left overnight in air; water repellency increased to 3.
[5] The treated sample was dipped for 30 seconds in a 15 weight percent ethyl lactate solution before oven drying at 138° C.
[6] The treated sample was placed in a carbon dioxide atmosphere for 10 minutes before oven drying at 140° C.
[7] Oven dried in carbon dioxide atmosphere.
[8] Precipitate of organosiloxane formed.

The above data indicate that when the molar titratable alkali is substantially in excess of the molar organosiloxane, the water repellency of the treated casings is substantially reduced. This is shown by runs 1–5. Runs 6–8 show that when the amount of alkali is reduced below the point where organosiloxane remains in solution, the organosiloxane will precipitate and water repellency of treated casing will be reduced. Runs 9–10 show that satisfactory water repellency of treated casings can be obtained even with excess alkali in the treating solution if the casing is subsequently dried in air. Run 11 shows that air drying is also useful when the treating solution contains low amount of alkali. Runs 12–14 show that neutralization of excess alkali during drying can produce desirable water repellency in the treated casing. Runs 15–17 show effect of alkali concentration similar to runs 1–5.

The principles of this invention are applicable to known cellulose sausage casing constructions such as the casings prepared by annularly extruding and regenerating a viscose solution to form continuous cellulosic tubing including, but not restricted to, the casing described in U.S. Patents 1,601,686 and 1,612,509. The invention also has utility in the manufacture of seamless casings reinforced with a fibrous web, as shown in U.S. Patents 2,105,273 and 2,144,900. A paper formed of hemp fibers bonded together with regenerated cellulose is preferred as the fibrous base tubing. Other nonwoven webs, such as Yoshino paper, rice paper, hemp, rayon, cotton and nylon; and woven fabrics, such as muslin, marquisette, cheesecloth, organdy and voile can also be used.

The tensile strength, transparency, elasticity and moisture permeability of the cellulose casings are substantially unchanged by the presence of the organopolysiloxane coating.

The sausage casings produced by the method described herein are admirably suited for use in the processing and packaging of meat products, for example, sausages and processed meats, such as bologna, beer sausage, salami, summer sausage, dry sausage, thuringer, frankfurters, hams, Canadian bacon, butts, pork butts, picnic sausage, and the like. The method and casings so produced can also be used for products other than meat products, such as cheese and other foods which require processing or distribution in casings. "Skinless" frankfurters may also be produced by using the casings of the present invention and using the methods in which the frankfurters are processed by smoking and heating and then removing the casings from the cured frankfurters. Alternatively, the cured frankfurters may be distributed to the ultimate consumer before removing the coated casing. The lack of adhesion of the casing to the frankfurter will allow the consumer to peel off the casing without scarring the surface of the food mass ensured therein.

Although the invention has been described in some detail and with particularity, it should be understood that changes, modifications and variations can be made therein without departing from the scope and spirit of the invention.

What is claimed is:

1. A process for improving the peelability of a tubular, regenerated, cellulosic food casing when in contact with a processed food mass encased therein comprising;
   (a) treating the external surface of a tubular, regenerated, cellulosic food casing with an alkaline aqueous solution of an organosiloxane having the unit formula

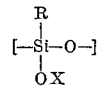

wherein R is selected from the class consisting of alkyl, aryl, aralkyl and alkaryl radicals and mixtures thereof wherein R can be different radicals, and X is a metal selected from the class consisting of sodium and potassium;
   (b) allowing said organosiloxane solution to diffuse through said tubular cellulosic casing until an organosiloxane layer is present on the inner surface of said tubular cellulosic casing; and,
   (c) drying the thusly treated tubular cellulosic casing to form an adherent organosiloxane coating on the inner surface of said tubular cellulosic casing such that said tubular cellulosic casing can be easily and readily peeled from a processed food mass encased therein without scarring the surface of said food mass.

2. The process of claim 1 wherein the organosiloxane has the unit formula

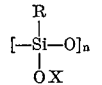

wherein R is selected from the class consisting of methyl, ethyl and propyl radicals, X is a metal selected from the class consisting of sodium and potassium and $n$ is an integer from 1 to 10, inclusive.

3. The process of claim 2 wherein the organosiloxane is sodium methyl silanolate.

4. The process of claim 2 wherein the alkaline aqueous solution of said organosiloxane contains titratable alkali in an amount from that at least sufficient to solubilize said organosiloxane up to that having equal molar amounts of said titratable alkali and said organosiloxane.

5. The process of claim 3 wherein said sodium methyl silanolate is present in said alkaline aqueous solution in an amount of between about 0.2 to 4.0 weight percent.

6. A process for improving the peelability of a tubular, regenerated cellulosic food casing when in contact with a processed food material encased therein which comprises;
   (a) treating the external surface of a tubular regenerated cellulosic food casing with an alkaline aqueous solution of an organosiloxane having the formula

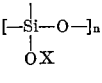

wherein R is selected from the class consisting of methyl, ethyl and propyl radicals, X is a metal selected from the class consisting of sodium and potassium and $n$ is an integer from 1 to 10, inclusive;
   (b) allowing the organosiloxane solution to diffuse through said tubular cellulosic casing to form an organosiloxane layer on the inner surface of said tubular cellulosic casing;

(c) treating the coated tubular cellulosic casing with a solution of water-soluble neutral organic ester; and, (d) drying the treated tubular cellulosic casing so as to form an adherent organosiloxane coating on the inner surface of the neutral tubular cellulosic casing.

7. The process of claim 6 wherein the water-soluble neutral organic ester is selected from the class consisting of ethyl lactate, glycerol monoacetate, glycerol diacetate and glycerol triacetate.

8. The process of claim 6 wherein the water-soluble neutral organic ester is ethyl lactate.

9. The process of claim 7 wherein the water-soluble neutral organic ester is glycerol triacetate.

10. A process for improving the peelability of a tubular, regenerated cellulosic food casing when in contact with a processed food mass encased therein comprising;

(a) treating a tubular, regenerated cellulosic food casing with an alkaline solution of an organosiloxane consisting essentially of units having the formula

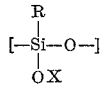

wherein R is selected from the class consisting of alkyl, aryl, aralkyl and alkaryl radicals and mixtures thereof wherein R can be different radicals and X is a metal selected from the class consisting of sodium and potassium so as to form a layer of said organosiloxane on the inner surface of said tubular cellulosic food casing;

(b) treating the coated casing with a solution of water-soluble neutral organic ester; and, (c) drying said treated tubular cellulosic food casing so as to form an adherent coating of said organosiloxane on the inner surface of said neutral tubular cellulosic food casing.

References Cited by the Examiner
UNITED STATES PATENTS

| | | | |
|---|---|---|---|
| 2,441,422 | 5/1948 | Krieble et al. | 260—29.2 |
| 2,587,636 | 4/1952 | MacMullen et al. | 260—448.2 |
| 2,985,545 | 5/1961 | Leavitt | 117—143 |

A. LOUIS MONACELL, *Primary Examiner.*

L. M. SHAPIRO, *Assistant Examiner.*